OPEN

ROTATION OF ORIFICE PLATE
CHANGES FLOW CHARACTERISTIC

7(a)

8(a)

SEMI PLUG COCK VALVE WITH CHARACTERIZED BODY
(BONNET & ACTUATOR NOT SHOWN)

United States Patent Office 3,504,887
Patented Apr. 7, 1970

3,504,887
FLOW CONTROL VALVES
Charles L. Okerblom, Warwick, R.I., assignor to International Telephone and Telegraph Corporation
Filed May 4, 1967, Ser. No. 636,037
Int. Cl. F16k 5/10, 29/00
U.S. Cl. 251—208                                6 Claims

ABSTRACT OF THE DISCLOSURE

A flow control valve comprising a rotatable plug supported by trunnions journalled along an axis transverse to the line carrying the fluid to be controlled. The surface of the plug moves across the face of a characterized orifice plate to controllably uncover an aperture therebetween through which the fluid then flows at a controlled rate.

---

This invention relates to flow control valves and more particularly to valves for controlling variation in the rate of flow of fluids including fluids containing a liberal amount of solid matter or semi-solid matter.

Flow control valves must be capable of controllably varying the rate of flow of fluid in addition to actually stopping and starting the flow. The most usual mode of controlling the rate of flow of fluid is by using a functionally shaped core or plug so that when the core is moved the control aperture changes its shape as well as its size.

Among the problems encountered with valves using functionally shaped cores is the tendency for such cores to be blocked by fluid contaminants, or slurries and slushes. Additionally, the actuating forces necessary to move the plug vary as the characterized or functionally shaped plug is moved.

The control of contaminated fluids, slurries and slushes often requires different types of flow characteristics depending on the particular use of the valve in the control cycle. For example, there are times when linear flow variations are required. Similarly, there are times when a quick opening characteristic, that is practically full flow, is required at the instant the valve is opened. With the presently available valves a different valve is required for each different desired flow characteristic.

Accordingly, an object of this invention is to provide a new and unique flow control valve which utilizes the shape of a characterized orifice plate to determine the flow characteristic of the valve.

A more specific object of this invention is to provide a characterized ball valve when the surface of the rotatable ball moves across the aperture of the characterized orifice plate.

A related object of this invention is to provide a flow control valve utilizing a characterized orifice plate which in cooperation with a rotatable plug controls the flow and wherein the orifice plate can be set to different positions to vary the flow characteristics imparted to the controlled fluid by the valve.

In accordance with a preferred embodiment of the invention a flow-control valve is made up of a combination comprising a rotatable plug supported by trunnions journalled along an axis transverse to the line carrying the fluid to be controlled. The plug rotates under the control of any well known sensor actuated operator. As the plug rotates its surface moves across the face of a characterized orifice plate to uncover the aperture of the orifice plate and thereby enable flow. The flow characteristics are determined by the shape of the aperture in the orifice plate as it is uncovered by the rotating ball. An added feature of the preferred embodiment is the means for changing the position of the orifice plate. By changing the position of the plate relative to the direction of movement of the ball plug the flow characteristics of the valve can be changed. Thus, one valve can provide a variety of different flow characteristics.

The configuration of the characterized aperture is especially useful in controlling the flow of slurries, slushes, and, in general, highly contaminated fluids having a large amount of suspended solids. The shearing action of the plug against the orifice plate insures positive closing. Particles which may become lodged between the characterized aperture and the plug are effectively sheared and the aperture is positively closed.

Figure 4A:
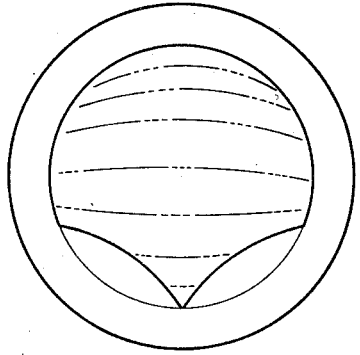
Figure 4B:
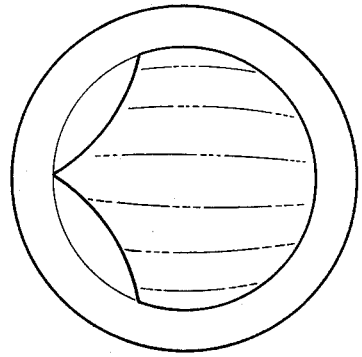
Figure 4C:
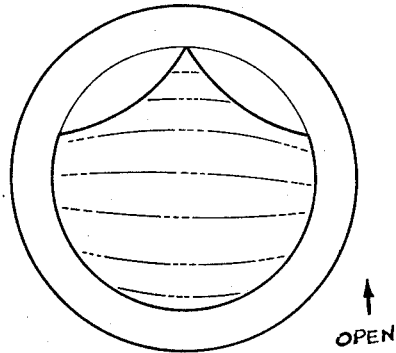
Figure 5:
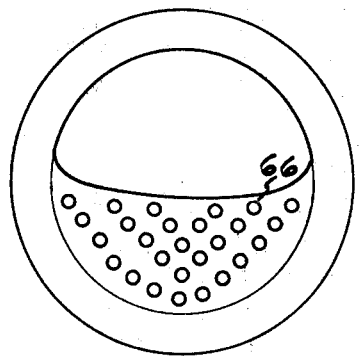
Figure 6:
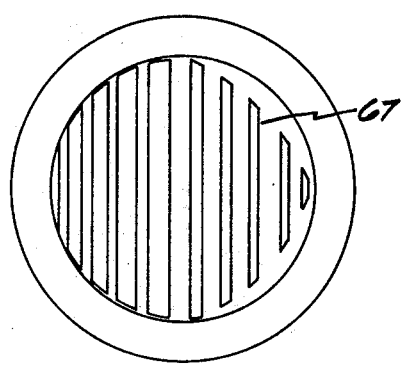
Figure 7B:
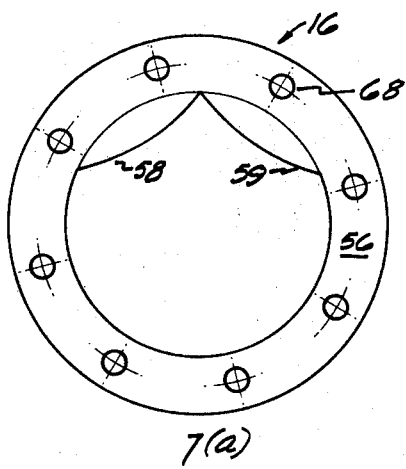
Figure 8B:
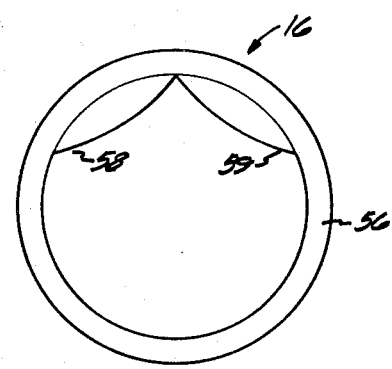
Figure 8B:
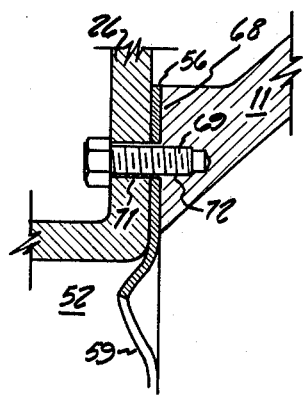
Figure 8B:
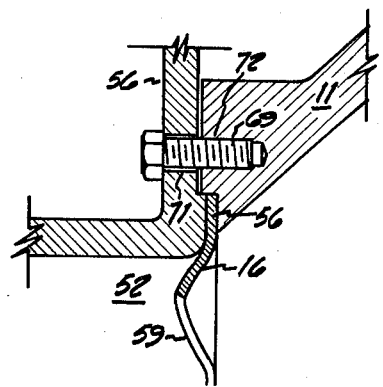
Figure 9:
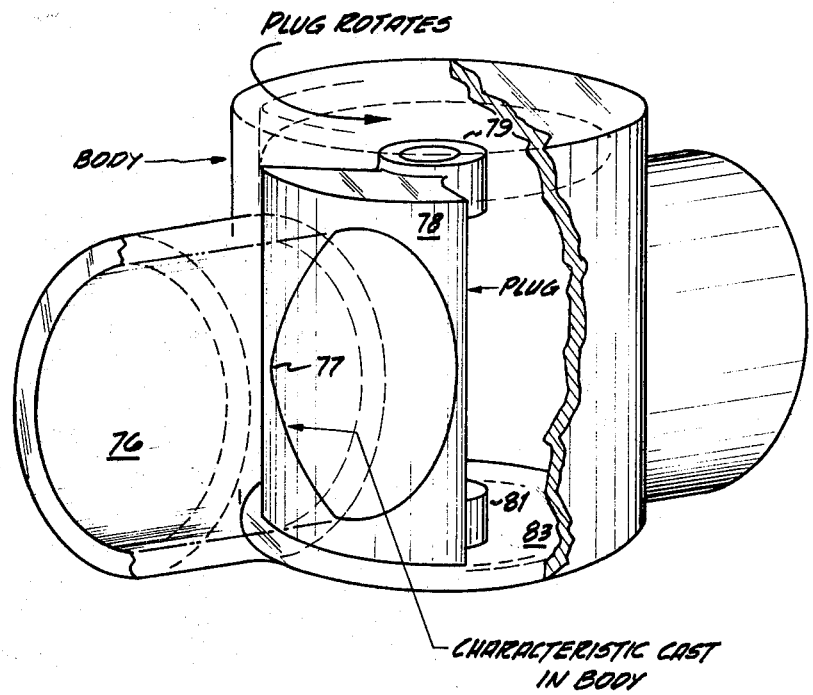

FIGS. 4a, 4b, and 4c show different flow characteristics obtainable when the characterized orifice plate is rotated about its own axis;

FIGS. 5 and 6 show orifice plates having other configurations;

FIGS. 7a and 7b show a characterized orifice plate with through-bolted mounting;

FIGS. 8a and 8b show a characterized orifice plate with clamped in place mounting; and FIG. 9 illustrates a semi-plug cock valve utilizing the inventive principles with a characterized body.

Figure 1:
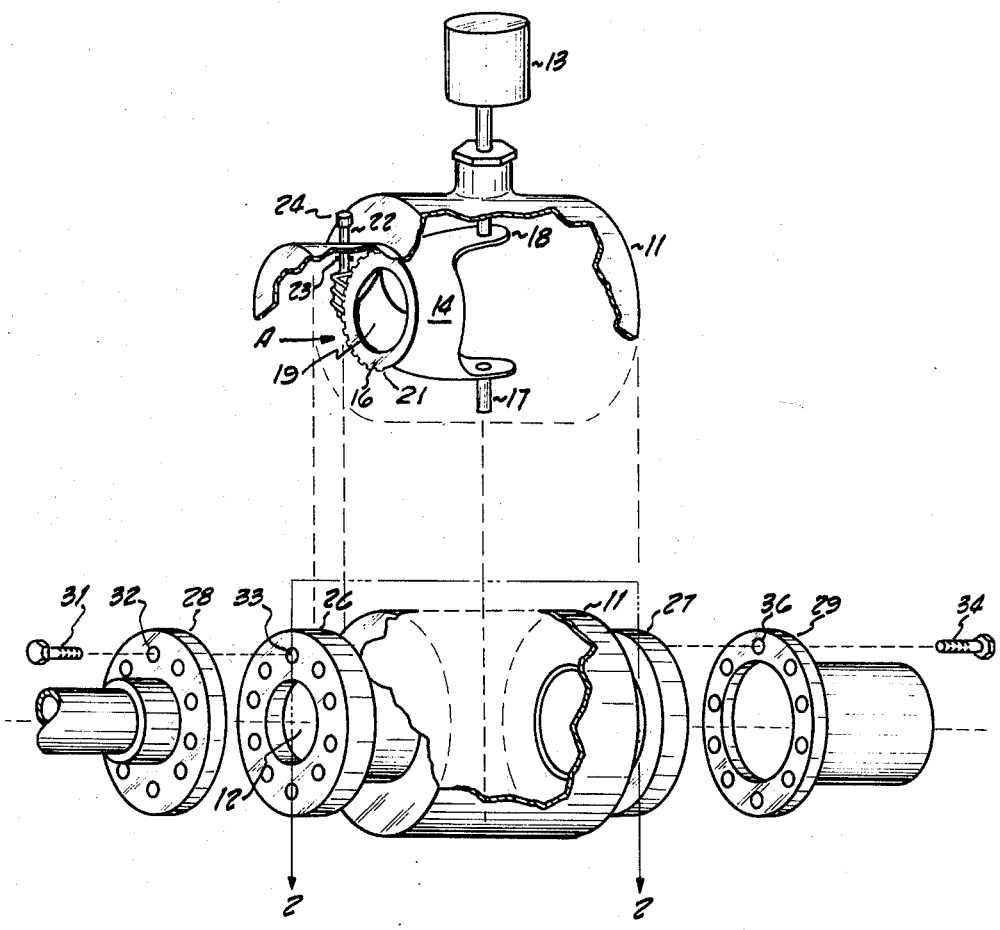
FIG. 1 is an exploded perspective view of a flow control valve of the present invention.

The exploded view of the inventive flow control valve in FIG. 1 shows an assembly comprising a casing 11 defining a passage 12.

A portion of the casing 11 is shown exploded in a representative manner above the main part of the valve. The exploded portion illustrates in a representative manner an operator 13 which may be any type of operator well known to those skilled in the art.

Means are provided for uniquely controlling fluid flow. More specifically, cooperatively disposed within the flow passage 12 are a spheroidal plug 14 and a characterized orifice plate 16. As can be most readily observed in the top portion of the exploded view of FIG. 1, the orifice plate is small gauge sheet material which is contoured to make contact with the face of the plug 14. The contact shown in FIG. 1 is a metal to metal contact.

The plug 14 rotates about trunnions 17, 18 journaled along an axis that is transverse to the flow direction as shown by arrow A. One end 17 of the axis rotates within a bearing surface mounted on the casing. The other end of the axis is coupled to the operator 13 which controls the valve by causing the axis to turn thereby turning the plug 14 away from the shaped aperture 19 of the orifice plate 16.

Means are provided for readily changing the operating characteristics of the valve. More specifically, the orifice plate 16 used to effect the seal is rotatable on its own axis to change the operating characteristics of the valve. The axis of the orifice plate 16 coincides with the flow as indicated by arrow A. In FIG. 1 the orifice plate is shown equipped with gear teeth 21 at its outer periphery. Meshed therewith is a worm gear rod 22 that extends through seal 23 and the valve casing 11. The top of the rod can be equipped as at 24 to receive an Allen wrench as shown or it may even be slotted to receive a screw driver for example. Thus, by turning rod 22, the orifice plate is caused to rotate about its axis, thereby varying the flow characteristics of the valve.

The casing 11, by way of example, is shown terminated in end flanges 26, 27. Actually it should be understood that normally the valve is supplied without end flanges, and is instead sandwiched between line flanges. The end flanges shown are designed to mate with fine flanges 28, 29 respectively. Fasteners, such as bolt 31, pass through hole 32 in the line flange 28 and threads into threaded hole 33 in end flange 26. Similarly, on the other side of the valve, bolt 34 passes through hole 36 in the line flange 29 and is screwed into a threaded hole, not shown, in end flange 27.

Figure 2:
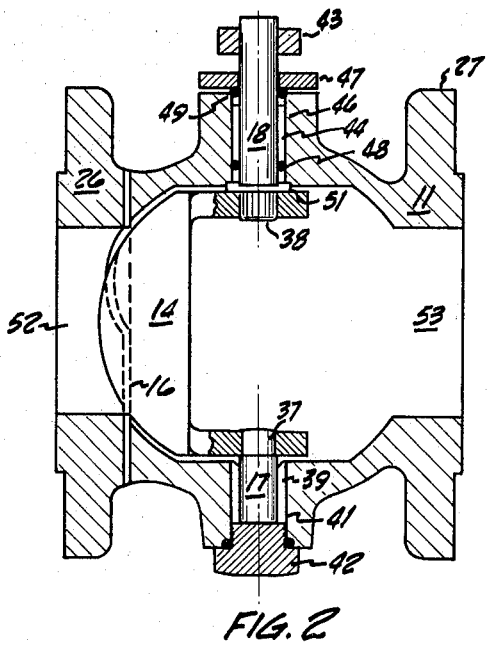
FIG. 2 is a cross sectional view of the valve of FIG. 1 (not exploded) taken along plane 2—2 of FIG. 1.

The cross sectional view of FIG. 2 more clearly illustrates the relationship between the operating parts of the inventive valve. Therein is shown trunnions 17, 18 associated with the plug 14 at holes 37, 38 respectively.

Trunnion 17 is mounted to rotate in bearing 39 press fitted into opening 41 in casing 11. The opening 41 is shown sealed by the threaded cap 42 which screws into threads in hole 41. If desired, an O ring seal 43 may be used to assure an adequate seal.

Trunnion 18 is coupled to an actuating rod (not shown) by means such as clevis pin 43. The trunnion 17 is also mounted to rotaote within bearing 44 responsive to the operation of the actuating rod. A top cap fitted onto opening 46 is attached to the casing either by threads on the cap and opening or with separate bolts. Suitable O rings, such as O rings 48, 49, are provided to assure that the controlled fluid is prevented from leaking out past the bearing, trunnion, and end cap. The interconnection between trunnion 18 and the plug is completed by a bearing and spacing gasket 51.

The operative connection between actuating trunnion 18 and the plug 14 can be made positive by such well known means, as using a splined shaft end on the trunnion, or any other well known key arrangement.

The plug 14 is shown with the valve in its closed position. That is, the plug 14 is contiguous to the entire periphery of the aperture in the orifice plate 16. The orifice plate is shown held pressed between the end flange 26 and casing 11. The end flange is coupled to the casing in any well known manner, such as with bolts (not shown).

The opening in the end flange provides an inlet 52 which is coupled to the supply pipe when the line flange is connected to flange 26. In a similar manner, an opening in end flange 27 defines the valve outlet 53. The flange 27 may be integrally connected to the casing or body of the valve 11.

Figure 3:
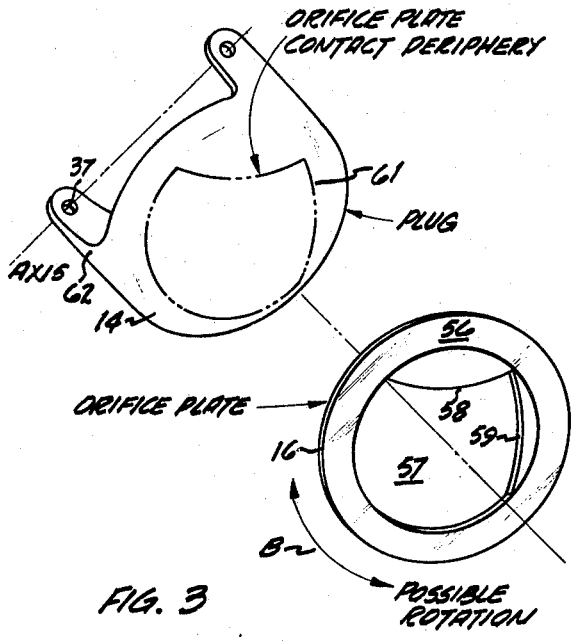
FIG. 3 is a pictorial representation of the spheroidal plug and the characterized orifice plate of the valve of FIG. 1.

FIG. 3 shows the plug 14 and the orifice plate 16 pictorially in greater detail. The orifice plate has a disk like solid peripheral region 56 surrounding the aperture 57. The characterized portion of the illustrated aperture plate comprises spheroidal wings 58, 59 that define an inverted V-shaped notch. The curvature of the wings is slightly greater than the curvature of the plug so that the face of the plug is juxtaposed and contiguous to the inside surface of the peripheral edge of the wings when the valve is in the closed position. The dashed line 61 on the plug defines the orifice plate contact points when the valve is in the closed position. The spheriodal wings 58, 59 are relieved from the curvature of the plug and the sealing action occurs at the inner periphery of the orifice plate, thus friction forces are reduced. It is therefore possible to lap the orifice plate to shape to achieve cut-off. The metal-to-metal edge seal afforded by the contiguous relationship of the plug into the aperture on the orifice plate also enables the plug to shear any solid material which may be in the path of the plug as it rotates about the axis through holes 37, 38 to the closed valve position. The shearing effect of the plug against the edges of the aperture is especially effective on fibrous solids.

Means, such as journal member 62, is provided for receiving the trunnions. As the plug 14 rotates about an axis through the hole 37 in the journal member 62 the aperture 57 in the orifice plate 16 is uncovered to enable flow through the valve. The shape of the aperture determines the operating characteristics of the valve. These characteristics can be varied by rotating the orifice around an axis through the center of the aperture in the directions indicated by arrow B.

FIGS. 4a to 4c show the orifice plate of FIG. 3 in three different positions to give three different flow characteristics. Of course, in each of the figures, it is assumed that the axis of the plug is horizontal and the plug rotates upward about the axis in the direction of the arrow shown next to FIG. 4c.

Under those conditions, the position of the orifice plate as shown in FIG. 4a, results in a flow wherein the change in flow rate changes geometrically with each increment of movement of the plug away from the aperture.

The position of the orifice plate as shown in FIG. 4b results in a flow wherein the flow rate changes linearly as a function of the change increment of the plug.

The position of the orifice plate as shown in FIG. 4c results in quick opening flow characteristics.

FIGS. 5 and 6 show orifice plates characterized in a different manner than the orifice plate of the previous figures. These showings are merely representations to indicate the large variety of configurations that can be utilized. For example, FIG. 5 shows the orifice plate 16 having a plurality of sieve like openings such as opening 66 located in the bottom spheriodal portion of the orifice plate. Thus, in this figure, the inhibited aperture is located above the sieve like spheroidal portion of the orifice plate. This type of orifice plate could be used, for example, where particular eddys or filtering is desired.

FIG. 6 shows an orifice plate having slots such as slot 67 in the spheroidal section of the plate. This type of orifice could also be used to generate particularly desired eddys. It is readily apparent that rotating either of the orifice plates of FIG. 5 or 6 would change the flow pattern derived from the valve.

Means are provided for mounting the orifice plate in the valve. In greater detail, as shown in FIG. 7a, the peripheral section 56 of the orifice plate 16 has a plurality of holes therein such as hole 68 to enable the passage of bolts therethrough. FIG. 7b shows how the orifice plate is through-bolted in place. In greater detail, bolts such as bolt 69, are used. The bolts slip-fit through holes such as hole 71, peripherally located around the end flange 26. The bolts are screwed into threaded holes, such as hole 72, in the body or casing 11. This bolts the orifice plate in place with spheriodally shaped wings 58, 59 just below the upper walls of inlet 52 defined by the end flange 26.

An alternate means of attaching the orifice plate is with the clamped construction as shown in FIG. 8a. The peripheral section 56 of the orifice plate 16 is much smaller than the peripheral section of FIG. 7a. Also there are no bolt holes through the peripheral section 56 in FIG. 8a. Instead, as best seen in FIG. 8b the bolts such as bolt 69, used to attach the end flange 56 to the casing 11 pass through hole 71 over the edge of the plate and into threaded hole 72 without coming into contact with the plate at all. Again, as in FIG. 7b the spheroidally shaped wings 59 extend into the inlet 52 defined by the end flange 56. The orifice plate is clamped in place when the bolts 64 are tightened into holes 72.

The illustrations depicted with this disclosure show the exemplary orifice plate effecting metal-to-metal seals. However, it should be understood that the seating of the plug on the orifice plate and also the sealing between the casing and the orifice could be accomplished by equipping the orifice plate with a backing of soft or resilient material. Similarly, the sealing could be accomplished by using a bonded dynamic seal or the well known O-ring seal. Other sealing variations could be used such as spring loaded thin wall metal inner seals or even lapped scraper seals. The aforementioned methods of sealing are well known to those skilled in the art, and as their illustration would not be of assistance in the understanding of the subject invention, they are not shown.

This invention embodies the valve construction shown in FIG. 9 wherein instead of a characterized orifice plate the body of the valve is molded or otherwise formed to provide the desired flow characteristics as shown in FIG. 9. The inlet 76 has a slot 77 in the general form of an arrowhead at one side thereof. The plug 78 is cylindrical and equipped with journal members 79, 81 to enable the plug to rotate so as to controllably uncover the characterized aperture of inlet 76. The flow then passes through the valve and out through outlet passage 82. The body of the valve 83 is shown without the bonnet actuator and end flanges with which it would normally be equipped. The shape of the inside of the body 83 of the semi-plug cock valve of FIG. 9 would, of course, match the contours of the cylindrically shaped plug, so that the body of the valve would act like the characterized orifice plate of the valve of FIG. 1.

In practice, the inventive valve of FIG. 1 is manufactured by mass production methods. When it arrives at its ultimate use point, the orifice plate is rotated by means such as an Allen wrench to turn shaft 22. This, in turn, rotates the orifice plate 16 to the desired position. After the orifice plate is in the desired position the threaded fasteners, such as 31, 34 couple the line flanges 28, 29 to the end flanges 26, 27. The valve is then positioned to have the plug 14 control the rate of flow of the line fluid under the control of the operator 13.

I claim:

1. A flow control valve comprising a valve casing having an inlet passage and an outlet passage, means for coupling said valve to a line, orifice plate means having a spaced aperture mounted between said inlet passage and said casing, plug means rotatably mounted within said casing to cooperate with said orifice plate means, means coupled to said plug means for rotating said plug means contiguously to said orifice plate means to selectively open an aperture between said plug means and said orifice plate means for controlling the flow through said valve, and means coupled to said orifice plate for rotating said orifice plate around an imaginary axis normal to the center of said orifice plate and normal to the axis of rotation of said plug means.

2. The flow control valve of claim 1 wherein said orifice plate has an aperture therein defined by spheroidal wings forming a V-shaped slot, and wherein said plug means is spheroidal to match said spheroidal wings.

3. The flow control valve of claim 2 wherein trunnion means journalled along an axis transverse to the direction of fluid flow through said valve are provided for rotatably supporting said plug means.

4. The flow control valve of claim 1 wherein said orifice rotating means comprises a gearing arrangement means accessible from outside the valve.

5. The flow control valve of claim 1 wherein said orifice plate has a spheroidal sieve like section and said plug is spheroidally shaped for cooperation with said sieve like section.

6. The flow control valve of claim 1 wherein said orifice plate is slotted.

References Cited

UNITED STATES PATENTS

| | | | |
|---|---|---|---|
| 1,221,702 | 4/1917 | Douglas | 251—301 XR |
| 1,770,900 | 7/1930 | Dawson | 137—330 |
| 2,564,223 | 8/1951 | Long | 251—209 |
| 323,314 | 7/1885 | Fuller | 251—315 X |
| 1,479,544 | 1/1924 | Johnson | 251—208 X |
| 2,592,371 | 4/1952 | Ackroyd | 251—209 X |
| 2,638,330 | 5/1953 | Morgenroth | 251—208 X |
| 2,845,949 | 8/1958 | Parker | 251—315 X |
| 3,191,906 | 6/1965 | Zeigler et al. | 251—208 |

FOREIGN PATENTS

| | | |
|---|---|---|
| 628,170 | 6/1927 | France. |
| 1,356,345 | 2/1964 | France. |
| 401,252 | 4/1932 | Great Britain. |

HENRY T. KLINKSIEK, Primary Examiner